Patented Oct. 28, 1941

2,260,626

UNITED STATES PATENT OFFICE 2,260,626

PROCESS OF PREPARING 4,4'-DISUBSTITUTED-DIPHENYL SULPHONES

Ervin C. Kleiderer and Arthur M. Van Arendonk, Indianapolis, Ind., assignors to Eli Lilly and Company, Indianapolis, Ind., a corporation of Indiana No Drawing. Application August 15, 1938,
Serial No. 225,050

2 Claims. (Cl. 260—397.6)

Our invention relates to the preparation of certain 4,4'-disubstituted-diphenyl sulphones, in which the substituents are amino groups which desirably are unsubstituted amino groups but may have one amino hydrogen replaced by an acyl group of the class consisting of aliphatic acyl groups having not more than 5 carbon atoms and the benzoyl group, and in which the two substituents are alike.

Those compounds are infection-combating agents. These compounds which are prepared by our process are all represented by the following general formula:

(1) 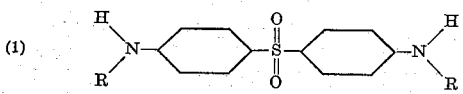

in which R represents hydrogen or an aliphatic acyl group having not more than 5 carbon atoms or the benzoyl group.

At present, we consider most desirable as infection-combating agents the products in which R represents hydrogen; and consider mainly as intermediate products those in which R represents something other than hydrogen within the defined class, although they also are infection-combating agents.

In carrying out our invention, the fundamental step is in producing oxidation of a 4,4'-diacylamino-diphenyl sulphide or sulphoxide, so that the acyl groups will protect the nitrogens of the amino groups in the 4 and 4' positions from oxidation and compel the oxidation to occur by the addition of two or one oxygen atoms to the central sulphur atom, with a change of valence of the sulphur atom from either 2 or 4 to 6; and in doing so without danger of obtaining contamination with metals. This oxidation may be made with already prepared and separated 4,4'-diacylamino-diphenyl sulphides or sulphoxides; or it may be made without separation of intermediate products after the 4,4'-diacylamino-diphenyl sulphides or sulphoxides have been prepared by acylation of the corresponding unacylated 4,4'-diamino-diphenyl sulphides or sulphoxides.

Since the purpose of the acyl groups is at least in part to protect the nitrogen atoms of the amino groups in the 4 and 4' positions against oxidation during the oxidation step, when that oxidation step has been completed we may if we wish remove the protecting acyl groups, but that is not fundamental to our main process; and if the removal of the acyl groups (or de-acylation) is not done we get the intermediate products above referred to, in which R is something other than hydrogen, while if the removal of the acyl groups (or de-acylation) is done we get products in which R represents hydrogen.

If we start with an unacylated initial compound — 4, 4' - diamino - diphenyl sulphide or sulphoxide (for instance thioaniline)—that initial compound may be represented by the following general formula:

(2) 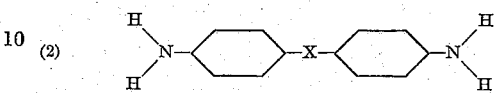

in which X represents

In that case, our first step is to acylate that initial compound by treating it with an acyl-containing compound in which the acyl group is of the class consisting of aliphatic acyl groups having not more than 5 carbon atoms and the benzoyl group, such for instance as acetic anhydride or acetyl chloride or propionic anhydride or propionyl chloride or benzoyl chloride. This acylation is desirably done in the presence of an organic acid as a solvent; and if the acylating agent contains an alkyl group, the organic acid is desirably the corresponding aliphatic acid. This acylation yields a compound which is represented by the following general formula:

(3) 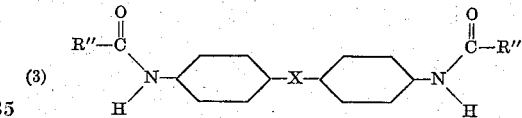

in which X has the same significance as before, and R'' represents an alkyl group having not more than 4 carbon atoms or the phenyl group.

This last-named product, represented by Formula 3, may be our initial compound, if it is available; and when it is not available it may be prepared as above outlined. It is with this compound that we take the oxidation step which is the fundamental step of the present invention.

To that end, in oxidizing this compound, we may do so without the necessity for separating it from the organic acid which is present (whether added or produced in the reaction) when the product is prepared in the manner above outlined; but if the product is available in solid form, we dissolve it in a water-miscible monobasic aliphatic acid.

We obtain this oxidation by treating the product of Formula 3, in concentrated acetic acid, with an excess of hydrogen peroxide over the amount theoretically necessary to produce the sulphone. By using hydrogen peroxide, the only by-product of the oxidation step is water; and thus there is no danger of contaminating the product with metals, such as occurs when metal-containing oxidizing agents are used. By using concentrated acetic acid, immediate precipitation of the sulphone produced in the oxidation is prevented; for, unlike certain seemingly analogous diphenyl sulphones in which an acyl-amino group is on one or both of the phenyl groups in the 2 position, applicants' 4,4'-diacylamino-diphenyl sulphone is so very insoluble in dilute acetic acid that it will not remain in solution therein following the oxidation. By using an excess of hydrogen peroxide over the amount theoretically necessary to produce the sulphone, the oxidation is carried through to the sulphone stage, with no danger of stopping at the sulphoxide stage; but, in contradistinction to a reported action when the amino group is in the 2 position on one phenyl group and a nitro group is in the 2 position on the other phenyl group, there is no danger with applicants' 4,4'-diacylamino-diphenyl compound of oxidizing any amino group to a nitro group to produce a dinitro-diphenyl compound.

In this oxidation of the 4,4'-diacyl-amino-diphenyl sulphide or sulphoxide, the sulphur atom in the compound to be oxidized has its valence changed from 2 or 4 to 6, so that two or one atoms of oxygen attach themselves to that sulphur atom by the additional valence bonds and do not go to the nitrogen atoms because those nitrogen atoms are protected by the presence thereon of the acyl groups.

The resultant product may be represented by the following general formula:

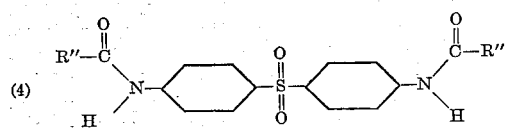

in which R'' has the same significance as before.

This product is the one of which we have hereinbefore spoken as the intermediate product, and we may stop with it. But we may go further, if desired. If so, this intermediate product is treated to remove the acyl groups, which had been previously attached to protect the nitrogen atoms against oxidation. This is done by hydrolysis with either a dilute acid or a dilute base, such for instance as dilute hydrochloric or dilute sodium hydroxide. If this hydrolysis is done with a dilute acid, the resultant salt which is then obtained as a second intermediate is treated with a base, such as sodium hydroxide or ammonium hydroxide, to convert it into the desired final product; whereas if it is done with a dilute base, the final product is directly obtained. For instance, if the hydrolysis is done with dilute hydrochloric acid, an intermediate salt is obtained of the following formula:

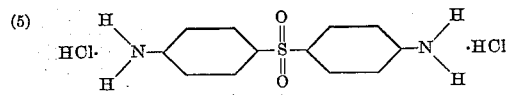

which is 4,4'-diamino-diphenyl sulphone dihydrochloride. When that is treated with ammonium hydroxide, for instance, the hydrochloric acid part of it is removed and neutralized, leaving 4,4'-diamino-diphenyl sulphone as the final product.

An example of our process is as follows:

*Example.*—We may start with thioaniline. If no pure thioaniline is available, we may use crude thioaniline. In that case, the crude thioaniline is first purified; which may conveniently be done substantially as follows: The crude thioaniline is first converted into its sulphate, by boiling with dilute sulphuric acid, and filtered to remove any solid impurities. The filtrate is then treated with decolorizing charcoal, boiled again, and again filtered. The filtrate is subjected to vacuum evaporation to remove the greater part of the solvent, leaving the thioaniline sulphate as a solid; which may be separated by filtration. This separated solid is dissolved in boiling water, and desirably treated with more decolorizing charcoal and again filtered; and the filtrate, while still warm, is made distinctly alkaline, as with ammonium or sodium hydroxide, and is cooled for several hours, as overnight, whereupon the purified thioaniline base precipitates out as a solid. This solid is removed by filtration and dried in the open at room temperature.

To 30 g. of thioaniline, purified as outlined if that is necessary, we add a solution of 60 cc. of acetic anhydride and 120 cc. of glacial acetic acid. The mixture is boiled gently for an hour, at atmospheric pressure, and then cooled to room temperature; whereupon an additional 500 cc. of glacial acetic acid is added. Then, without any separation being made, we add, with stirring, about 50 cc. of an approximately 30% solution of hydrogen peroxide; and then allow the solution to stand without stirring for several hours, say 3 or 4 hours, during which some oxidation occurs. During this standing, the temperature of the solution will rise to about 40° C. during the first hour; but the solution will get cooler within 3 or 4 hours. At the end of that standing period, the solution is warmed to about 50° C., and allowed to stand for 2 or 3 hours, during which further oxidation occurs. After that standing period, we heat the whole to boiling temperature, whereupon practically all of any precipitate which has been formed redissolves; and if it does not all dissolve, we may add some additional glacial acetic acid until all of it is dissolved, although that is not essential. Promptly after boiling occurs, the solution is allowed to cool until ebullition has ceased; whereupon, while stirring rapidly, we add approximately 30 cc. more of the 30% solution of hydrogen peroxide. Then we allow the solution to cool, and place it in a refrigerator overnight; after which we filter off the precipitate (precipitate A) which has formed, treat the filtrate with twice its volume of water, and place that diluted filtrate in the refrigerator for several hours, to get a second precipitate (precipitate B).

The first precipitate (precipitate A) will weigh about 30 g., and is a fairly pure 4,4'-diacetyl-amino-diphenyl sulphone, which should have a melting point of about 275–278° C.; and when melted in a melting-point tube it should not become very dark on melting. In case its melting point is less than that, or if the material becomes dark in the melting-point tube on melting, which in either instance indicates a lack of purity, we dissolve this first precipitate (precipitate A) in boiling glacial acetic acid, add about 10 cc. of a 30% solution of hydrogen peroxide, and cool overnight, to get a precipitate (precipitate A') of purer 4,4'-diacetylamino-diphenyl sulphone.

The second precipitate (precipitate B) above referred to, obtained on dilution and cooling after removing the first precipitate (precipitate A), is a rather impure 4,4'-diacetylamino-diphenyl sulphone; but this is of rather small amount, usually not exceeding 5 g., and it is usually placed aside until it may be combined with similar second precipitates (precipitates B) from other runs. Then the combined second precipitates (precipitates B) may be purified, by dissolving them in boiling glacial acetic acid and adding about 5 cc. of a 30% solution of hydrogen peroxide for each 10 g. of precipitate, cooling overnight in a refrigerator, and filtering off the thus-purified second precipitate (precipitate B').

The 4,4'-diacetylamino-diphenyl sulphone obtained may now be hydrolyzed, if desired, to remove the acetyl groups; for those acetyl groups are no longer needed to protect the nitrogen atoms against oxidation, as the oxidation has been completed.

This hydrolysis may be done by treating simply with dilute sodium hydroxide or dilute potassium hydroxide; which produces sodium or potassium acetate as a by-product, and precipitates the desired 4,4'-diamino-diphenyl sulphone. We prefer, however, to use acid hydrolysis. In that case we treat 10 g. of the solid 4,4'-diacetylamino-diphenyl sulphone with 100 cc. of dilute hydrochloric acid (of about 10% concentration), and reflux until the solid has been dissolved, which usually takes about one hour to an hour and a half. This reaction produces 4,4'-diamino-diphenyl sulphone dihydrochloride, with acetic acid as a by-product. When the solid has been completely dissolved, we add some decolorizing charcoal, say about 1 g., and continue refluxing for another hour. Then we filter while hot, and cool the filtrate. To this cooled filtrate we add enough ammonium hydroxide to raise the pH to a point somewhat short of neutrality, and then cool again to dissipate the heat generated by the neutralizing reaction. When the solution is cold, we then add ammonium hydroxide in excess, which produces a precipitate of 4,4'-diamino-diphenyl sulphone. We separate this precipitate from the supernatant liquid, as by filtration; dissolve it in water, with just enough hydrochloric acid added to obtain complete solution; add some decolorizing charcoal, and allow the whole to stand for 15 minutes or more; and then filter to obtain a substantially clear filtrate. We make this filtrate alkaline with ammonium hydroxide, which precipitates the 4,4'-diamino-diphenyl sulphone, cool the whole, and filter to obtain that precipitate. With the proportions noted, that precipitate usually weighs about 7 g.; and it has a melting point of approximately 172–174° C., corrected.

We claim as our invention:

1. In the process of preparing 4,4'-diacylamino-diphenyl sulphones which are represented by the following formula:

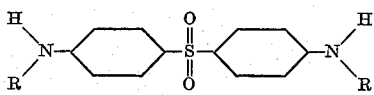

in which R represents a member of the class consisting of aliphatic acyl groups having not more than 5 carbon atoms and the benzoyl group, the step of oxidizing a member of the class consisting of 4,4'-diacylamino-diphenylsulphides and 4,4'-diacylamino-diphenyl sulphoxides by treating it in concentrated acetic acid with an excess of hydrogen peroxide over the amount theoretically necessary to produce the sulphone.

2. In the process of preparing 4,4'-diacetamino-diphenyl sulphone, the step of oxidizing a member of the class consisting of 4,4'-diacetamino-diphenyl sulphide and 4,4'-diacetamino-diphenyl sulphoxide by treating it in concentrated acetic acid with an excess of hydrogen peroxide over the amount theoretically necessary to produce the sulphone.

ERVIN C. KLEIDERER.
ARTHUR M. VAN ARENDONK.